(12) United States Patent
Sun et al.

(10) Patent No.: US 12,439,287 B2
(45) Date of Patent: Oct. 7, 2025

(54) COMMUNICATION METHOD FOR DUAL CONNECTIVITY SYSTEM AND COMMUNICATION APPARATUS

(71) Applicant: HUAWEI TECHNOLOGIES CO., LTD., Guangdong (CN)

(72) Inventors: Huiming Sun, Shenzhen (CN); Tingting Geng, Shenzhen (CN); Hongping Zhang, Shenzhen (CN); Xingxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 18/079,159

(22) Filed: Dec. 12, 2022

(65) Prior Publication Data

US 2023/0109703 A1    Apr. 13, 2023

Related U.S. Application Data

(63) Continuation of application No. PCT/CN2021/100823, filed on Jun. 18, 2021.

(30) Foreign Application Priority Data

Jun. 24, 2020    (CN) .......................... 202010589354.X

(51) Int. Cl.
*H04W 24/08*        (2009.01)
*H04W 24/10*        (2009.01)
(Continued)

(52) U.S. Cl.
CPC .......... *H04W 24/10* (2013.01); *H04W 24/08* (2013.01); *H04W 36/0069* (2018.08);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2018/0302945 A1    10/2018 Kwon
2020/0229081 A1*   7/2020  Ang ................. H04W 24/10
2021/0352750 A1*   11/2021 Cheng ............... H04W 24/10

FOREIGN PATENT DOCUMENTS

CN    106105302 A    11/2016
CN    110447285 A    11/2019
(Continued)

OTHER PUBLICATIONS

3GPP TS 38.215 V16.1.0 (Mar. 2020), 3rd Generation Partnership Project; Technical Specification Group Radio Access Network; NR; Physical layer measurements(Release 16), 22 pages.
(Continued)

*Primary Examiner* — Timothy J Weidner

(57) ABSTRACT

A communication method for a dual connectivity system and a communication apparatus are disclosed, to support relaxing radio resource management (RRM) measurement. The method includes: A first network device determines that a terminal device is to deactivate a secondary cell group (SCG) of the terminal device; the first network device sends first information to the terminal device, where the first information indicates the terminal device to deactivate the secondary cell group SCG of the terminal device, to enable the terminal device to relax SCG RRM measurement after deactivating the SCG; and the terminal device relaxes the SCG RRM measurement after deactivating the SCG based on the first information. The first network device is a master node or a secondary station of the terminal device. In this
(Continued)

way, when the SCG is deactivated, relaxing the SCG RRM measurement can be supported.

17 Claims, 6 Drawing Sheets

(51) Int. Cl.
　　*H04W 36/00*　　(2009.01)
　　*H04W 76/15*　　(2018.01)
　　*H04W 76/25*　　(2018.01)
　　*H04W 84/02*　　(2009.01)
　　*H04W 88/02*　　(2009.01)
　　*H04W 88/08*　　(2009.01)
　　*H04W 92/02*　　(2009.01)
　　*H04W 92/10*　　(2009.01)
　　*H04W 92/20*　　(2009.01)

(52) U.S. Cl.
　　CPC ....... *H04W 36/0088* (2013.01); *H04W 76/15* (2018.02); *H04W 76/25* (2018.02); *H04W 84/02* (2013.01); *H04W 88/02* (2013.01); *H04W 88/08* (2013.01); *H04W 92/02* (2013.01); *H04W 92/10* (2013.01); *H04W 92/20* (2013.01)

(58) Field of Classification Search
　　CPC .. H04J 2011/0003–0096; H04L 5/0001–0098; H04W 8/22–245; H04W 24/02–10; H04W 28/02–26; H04W 36/0005–385; H04W 48/02–20; H04W 52/02–60; H04W 60/005–06; H04W 72/02–569; H04W 76/10–50; H04W 84/02–16; H04W 88/02–12; H04W 92/02–24; Y02D 30/70

See application file for complete search history.

(56) References Cited

FOREIGN PATENT DOCUMENTS

| | | |
|---|---|---|
| CN | 110557849 A | 12/2019 |
| CN | 111194074 A | 5/2020 |
| CN | 111294853 A | 6/2020 |

OTHER PUBLICATIONS

3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.
3GPP TS 36.331 V16.0.0 (Mar. 2020), 3rd Generation Partnership Project; Technical Specification Group Radio Access Network; Evolved Universal Terrestrial Radio Access (E-UTRA); Radio Resource Control (RRC); Protocol specification (Release 16), 1048 pages.
3GPP TS 38.423 V16.1.0 (Mar. 2020), 3rd Generation Partnership Project; Technical Specification Group Radio Access Network; NG-RAN; Xn application protocol (XnAP)(Release 16), 334 pages.
3GPP TS 36.423 V16.1.0 (Mar. 2020), 3rd Generation Partnership Project; Technical Specification Group Radio Access Network; Evolved Universal Terrestrial Radio Access Network(E-UTRAN); X2 application protocol (X2AP)(Release 16), 438 pages.
CATT, Dormant SCG state. 3GPP TSG-RAN WG2 Meeting #107bis, Chongqing, P.R.China, Oct. 14-Oct. 18, 2019, R2-1912118, 4 pages.

\* cited by examiner

COMMUNICATION METHOD FOR DUAL CONNECTIVITY SYSTEM AND COMMUNICATION APPARATUS

CROSS-REFERENCE TO RELATED APPLICATIONS

This application is a continuation of International Patent Application No. PCT/CN2021/100823, filed on Jun. 18, 2021, which claims priority to Chinese Application No. 202010589354.X, filed on Jun. 24, 2020. The disclosures of the aforementioned applications are hereby incorporated by reference in their entireties.

TECHNICAL FIELD

This application relates to the field of communication technologies, and in particular, to a communication method for a dual connectivity system and communication apparatus.

BACKGROUND

In a dual connectivity (dual connectivity, DC) scenario, two base stations can simultaneously provide data transmission services for one terminal device. A base station in which a primary cell (primary cell, PCell) is located is referred to as a master base station, and another base station (namely, a base station in which a primary secondary cell (primary secondary cell, PSCell) is located) is referred to as a secondary base station. A plurality of serving cells in the secondary base station form a secondary cell group (secondary cell group, SCG), and the SCG includes one PSCell and one or more secondary cells (secondary cells, SCells).

To reduce power consumption of the terminal device, an SCG deactivation or SCG suspend (SCG deactivation/SCG suspend) mechanism is introduced. To be specific, when a service of the terminal device on a secondary base station side is in a low-active state or has a low requirement for a data transmission speed, the terminal device temporarily deactivates or suspends the SCG. Specific operations include that the terminal device does not monitor physical downlink control channels (physical downlink control channels, PDCCHs) of the PSCell and the SCell in the SCG. When the service of the terminal device on the secondary base station side is in an active state or has a high requirement for the data transmission speed, the terminal device keeps the SCG in the active state. However, when the SCG of the terminal device is in an inactive state, behavior of the terminal device still causes unnecessary power consumption.

SUMMARY

This application provides a communication method for a dual connectivity system and a communication apparatus, to support relaxing RRM measurement when an SCG is deactivated, so as to reduce power consumption of a terminal device.

According to a first aspect, this application provides a communication method for a dual connectivity system. The method may include: A terminal device receives first information from a first network device; and the terminal device relaxes SCG radio resource management (radio resource management, RRM) measurement after deactivating an SCG based on the first information, where the first information indicates the terminal device to deactivate the secondary cell group SCG of the terminal device, and the first network device is a master station or a secondary station of the terminal device.

In the foregoing method, when the SCG is deactivated, relaxing the SCG RRM measurement can be supported, to reduce power consumption of the terminal device.

In a possible design, the SCG RRM measurement includes RRM measurement on the SCG, RRM measurement on a frequency of a serving cell in the SCG or a frequency of a neighboring cell in the SCG, or RRM measurement configured by the secondary station for the terminal device. The RRM measurement configured by the secondary station for the terminal device may be understood as RRM measurement on an SCG configured by the secondary station for the terminal device. The RRM measurement configured by the secondary station for the terminal device may also be understood as RRM measurement performed for mobility management on the UE in the SCG. In this way, the SCG RRM measurement can be specified, so that subsequently, the terminal device accurately relaxes the SCG RRM measurement.

In a possible design, the terminal device receives second information from the first network device, where the second information indicates to relax the RRM measurement on the SCG, the RRM measurement on the frequency of the serving cell in the SCG or the frequency of the neighboring cell in the SCG, or the RRM measurement configured by the secondary station for the terminal device. In this way, the terminal device can accurately relax the SCG RRM measurement according to an indication.

In a possible design, the second information and the first information are included in a same message sent by the first network device to the terminal device. In this way, signaling overheads can be reduced.

In a possible design, the terminal device obtains a first measurement configuration, where the first measurement configuration includes: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary station for the terminal device. In this way, the terminal device can accurately relax the SCG RRM measurement based on the configuration information.

In a possible design, the first measurement configuration and the first information may be included in the same message sent by the first network device to the terminal device. In this way, the signaling overheads can be reduced.

In a possible design, the configuration information for relaxing the RRM measurement on the SCG may include one or more of the following: an extended measurement periodicity, an extended measurement periodicity of a secondary cell SCell in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG. In this way, the terminal device can accurately relax the RRM measurement on the SCG based on specific configuration information.

In a possible design, the configuration information for relaxing the RRM measurement on the frequency of the serving cell in the SCG or the frequency of the neighboring cell in the SCG may include one or more of the following: an extended measurement periodicity of the frequency of the serving cell in the SCG or the frequency of the neighboring cell in the SCG, indication information indicating to reduce a quantity of frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG. In this way, the terminal device can accurately relax the RRM measurement on the frequency of the serving cell in the SCG or the frequency of the neighboring cell in the SCG based on specific configuration information.

In a possible design, the configuration information for relaxing the RRM measurement configured by the secondary station for the terminal device may include one or more of the following: an extended measurement periodicity of a neighboring cell in the SCG configured by the secondary station for the terminal device, an extended measurement periodicity of a serving cell in the SCG configured by the secondary station for the terminal device, indication information indicating to reduce a quantity of measurement frequencies or cells configured by the secondary station for the terminal device, indication information indicating to measure a serving cell in the SCG configured by the secondary station for the terminal device as a neighboring cell, indication information indicating not to measure a neighboring cell or a frequency of the neighboring cell in the SCG configured by the secondary station for the terminal device, or indication information indicating not to report a measurement result of a neighboring cell or a frequency of the neighboring cell in the SCG configured by the secondary station for the terminal device. In this way, the terminal device can accurately relax, based on specific configuration information, the RRM measurement configured by the secondary station for the terminal device.

In a possible design, a specific method in which the terminal device relaxes the SCG RRM measurement may be that the terminal device performs one or more of the following operations: extending measurement periodicities of all or a part of frequencies of serving cells in the SCG, extending measurement periodicities of all or a part of frequencies of neighboring cells in the SCG, extending a measurement periodicity of the serving cell and/or the neighboring cell in the SCG, reducing the quantity of to-be-measured frequencies of serving cells in the SCG or frequencies of neighboring cells in the SCG, reducing the quantity of to-be-measured cells, measuring the SCG as the neighboring cells, skipping performing RRM measurement configured by the secondary station for the terminal device, skipping measuring the neighboring cell or the frequency of the neighboring cell in the SCG, or skipping reporting the measurement result of the neighboring cell or the frequency of the neighboring cell in the SCG. In this way, the terminal device can accurately relax the SCG RRM measurement, to reduce the power consumption of the terminal device.

In a possible design, the terminal device receives, from a second network device, a trigger condition for relaxing the SCG RRM measurement. A specific method in which the terminal device relaxes the SCG RRM measurement may be: The terminal device relaxes the SCG RRM measurement when the trigger condition is met, where the second network device is the master station or the secondary station. In this way, the terminal device can relax the SCG RRM measurement only when the trigger condition is met, so that more refined control can be implemented on relaxation of the SCG RRM measurement.

In a possible design, the trigger condition may be that a signal quality change of a primary secondary cell PSCell in the SCG in a specified period is not greater than a first threshold, and/or signal quality of the PSCell in the specified period is greater than a second threshold. In this way, the terminal device can accurately determine whether the trigger condition for relaxing the SCG RRM measurement is met, so that the terminal device relaxes the SCG RRM measurement on an accurate occasion.

In a possible design, the terminal device receives third information from the second network device, where the third information indicates to release the trigger condition for relaxing the SCG RRM measurement. The terminal device releases the trigger condition for relaxing the SCG RRM measurement, and stops relaxing the SCG RRM measurement. In this way, the terminal device can release a resource, and stop relaxing the SCG RRM measurement on an appropriate occasion, to restore a service.

According to a second aspect, this application provides a communication method for a dual connectivity system. The method may include: After determining that a terminal device is to deactivate a secondary cell group SCG of the terminal device, a first network device sends first information to the terminal device, where the first information indicates the terminal device to deactivate the SCG, to enable the terminal device to relax SCG radio resource management RRM measurement after deactivating the SCG; and the first network device is a master station or a secondary station of the terminal device.

In the foregoing method, when the SCG is deactivated, relaxing the SCG RRM measurement can be supported, to reduce power consumption of the terminal device.

In a possible design, the SCG RRM measurement includes RRM measurement on the SCG, RRM measurement on a frequency of a serving cell in the SCG or a frequency of a neighboring cell in the SCG, or RRM measurement configured by the secondary station for the terminal device. In this way, the SCG RRM measurement can be specified, so that subsequently, the terminal device accurately relaxes the SCG RRM measurement.

In a possible design, the first network device sends second information to the terminal device, where the second information indicates to relax the RRM measurement on the SCG, the RRM measurement on the frequency of the serving cell in the SCG or the frequency of the neighboring cell in the SCG, or the RRM measurement configured by the secondary station for the terminal device. In this way, the terminal device can accurately relax the SCG RRM measurement according to an indication.

In a possible design, the second information and the first information are included in a same message sent by the first network device to the terminal device. In this way, signaling overheads can be reduced.

In a possible design, the first network device sends a first measurement configuration to the terminal device, where the first measurement configuration includes: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary station for the terminal device. In this way, the terminal device can accurately relax the SCG RRM measurement based on the configuration information.

In a possible design, the first measurement configuration and the first information may be included in the same message sent by the first network device to the terminal device. In this way, the signaling overheads can be reduced.

In a possible design, the configuration information for relaxing the RRM measurement on the SCG may include one or more of the following: an extended measurement periodicity, an extended measurement periodicity of a secondary cell SCell in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG. In this way, the terminal device can accurately relax the RRM measurement on the SCG based on specific configuration information.

In a possible design, the configuration information for relaxing the RRM measurement on the frequency of the serving cell in the SCG or the frequency of the neighboring cell in the SCG may include one or more of the following: an extended measurement periodicity of the frequency of the serving cell in the SCG or the frequency of the neighboring cell in the SCG, indication information indicating to reduce a quantity of frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG. In this way, the terminal device can accurately relax the RRM measurement on the frequency of the serving cell in the SCG or the frequency of the neighboring cell in the SCG based on specific configuration information.

In a possible design, the configuration information for relaxing the RRM measurement configured by the secondary station for the terminal device may include one or more of the following: an extended measurement periodicity of a neighboring cell in the SCG configured by the secondary station for the terminal device, an extended measurement periodicity of a serving cell in the SCG configured by the secondary station for the terminal device, indication information indicating to reduce a quantity of measurement frequencies or cells configured by the secondary station for the terminal device, indication information indicating to measure a serving cell in the SCG configured by the secondary station for the terminal device as a neighboring cell, indication information indicating not to measure a neighboring cell or a frequency of the neighboring cell in the SCG configured by the secondary station for the terminal device, or indication information indicating not to report a measurement result of a neighboring cell or a frequency of the neighboring cell in the SCG configured by the secondary station for the terminal device. In this way, the terminal device can accurately relax, based on specific configuration information, the RRM measurement configured by the secondary station for the terminal device.

In a possible design, the first network device sends, to the terminal device, a trigger condition for relaxing the SCG RRM measurement. In this way, the terminal device can relax the SCG RRM measurement only when the trigger condition is met, so that more refined control can be implemented on relaxation of the SCG RRM measurement.

In a possible design, the trigger condition may be that a signal quality change of a primary secondary cell PSCell in the SCG in a specified period is not greater than a first threshold, and/or signal quality of the PSCell in the specified period is greater than a second threshold. In this way, the terminal device can accurately determine whether the trigger condition for relaxing the SCG RRM measurement is met, so that the terminal device relaxes the SCG RRM measurement on an accurate occasion.

In a possible design, the first network device sends, to a second network device, the trigger condition for relaxing the SCG RRM measurement, and receives, from the second network device, a response message in response to the trigger condition for relaxing the SCG RRM measurement, where the response message is for acknowledging or modifying the trigger condition for relaxing the SCG RRM measurement. When the first network device is the master station of the terminal device, the second network device is the secondary station of the terminal device. When the first network device is the secondary station of the terminal device, the second network device is the master station of the terminal device. In this way, the master station and the secondary station can agree on the trigger condition for relaxing the SCG RRM measurement.

In a possible design, the first network device sends first request information to the second network device, and receives, from the second network device, a first response message in response to the first request message, where the first request information is for requesting to release the trigger condition for relaxing the SCG RRM measurement. When the first network device is the master station of the terminal device, the second network device is the secondary station of the terminal device. When the first network device is the secondary station of the terminal device, the second network device is the master station of the terminal device. In this way, the master station and the secondary station can agree on a release of the trigger condition for relaxing the SCG RRM measurement.

In a possible design, the first network device sends third information to the terminal device, where the third information indicates to release the trigger condition for relaxing the SCG RRM measurement. In this way, the terminal device can release a resource, and stop relaxing the SCG RRM measurement on an appropriate occasion, to restore a service.

In a possible design, when the first network device is the master station of the terminal device, the first network device receives fourth information from the secondary station, where the fourth information indicates that a service of the terminal device in the SCG is in a low-active state. A specific method in which the first network device determines that the terminal device is to deactivate the SCG may be: The first network device determines, based on the fourth information, that the terminal device is to deactivate the SCG. In this way, the master station may determine, based on a status of the service that is in the SCG and that is reported by the secondary station, that the terminal device is to deactivate the SCG.

In a possible design, when the first network device is the master station of the terminal device, a specific method in which the first network device determines that the terminal device is to deactivate the SCG may be: The first network device determines, based on a traffic volume of the terminal device in the SCG, that the terminal device is to deactivate the SCG. In this way, the master station may directly determine that the terminal device is to deactivate the SCG.

In a possible design, when the first network device is the secondary station of the terminal device, a specific method in which the first network device determines that the terminal device is to deactivate the SCG may be: When determining that a service of the terminal device in the SCG is in a low-active state, the first network device determines that the terminal device is to deactivate the SCG. In this way, the master station may directly determine that the terminal device is to deactivate the SCG.

In a possible design, the first network device sends fifth information to the master station, where the fifth information indicates that the service of the terminal device in the SCG is in the low-active state. In this way, the secondary station may notify the master station of a current status of the service of the terminal device in the SCG, so that the master station can determine that the terminal device is to deactivate the SCG.

In a possible design, that a service in the SCG is in a low-active state may include one or more of the following: a data amount of the terminal device is less than a third threshold, a service of a PDU session of the terminal device is in a low-active state, a quality of service flow— level service is in a low-active state, a service of an SN terminated bearer of the terminal device is in a low-active state, and an SCG bearer is in a low-active state. In this way, the status of the service of the terminal device in the SCG can be flexibly determined in a plurality of methods.

According to a third aspect, this application further provides a communication apparatus. The communication apparatus has a capability of a dual connectivity system, the communication apparatus may be a terminal device in the dual connectivity system, and the communication apparatus has a function of implementing the terminal device in the first aspect or the possible design examples of the first aspect. The function may be implemented by hardware, or may be implemented by hardware executing corresponding software. The hardware or the software includes one or more modules corresponding to the foregoing function.

In a possible design, a structure of the communication apparatus may include a transceiver unit and a processing unit. These units may perform corresponding functions of the terminal device in the first aspect or the possible design examples of the first aspect. For details, refer to detailed descriptions in the method examples. Details are not described herein again.

In a possible design, a structure of the communication apparatus includes a transceiver and a processor, and optionally further includes a memory. The transceiver is configured to receive and send data, and is configured to communicate and interact with another device in a communication system. The processor is configured to support the communication apparatus in performing a corresponding function of the terminal device in the first aspect or the possible design examples of the first aspect. The memory is coupled to the processor, and stores program instructions and data that are necessary for the communication apparatus.

According to a fourth aspect, this application further provides a communication apparatus. The communication apparatus has a capability of a dual connectivity system, and the communication apparatus may be a master station or a secondary station in the dual connectivity system. For example, the communication apparatus may be the first network device, and the communication apparatus has a function of implementing the first network device in the second aspect or the possible design examples of the second aspect. The function may be implemented by hardware, or may be implemented by hardware executing corresponding software. The hardware or the software includes one or more modules corresponding to the foregoing function.

In a possible design, a structure of the communication apparatus may include a transceiver unit and a processing unit. These units may perform corresponding functions of the first network device in the second aspect or the possible design examples of the second aspect. For details, refer to detailed descriptions in the method examples. Details are not described herein again.

In a possible design, a structure of the communication apparatus includes a transceiver and a processor, and optionally further includes a memory. The transceiver is configured to receive and send data, and is configured to communicate and interact with another device in a communication system. The processor is configured to support the communication apparatus in performing a corresponding function of the terminal device in the second aspect or the possible design examples of the second aspect. The memory is coupled to the processor, and stores program instructions and data that are necessary for the communication apparatus.

According to a fifth aspect, an embodiment of this application provides a communication system. The communication system may include the foregoing terminal device, the foregoing first network device (the master station or the secondary station), and the like.

According to a sixth aspect, an embodiment of this application provides a computer-readable storage medium. The computer-readable storage medium stores program instructions. When the program instructions are run on a computer, the computer is enabled to perform any one of the first aspect and the possible designs of the first aspect, or any one of the second aspect and the possible designs of the second aspect of embodiments of this application. For example, the computer-readable storage medium may be any usable medium accessible to a computer. The following provides an example but does not impose a limitation: The computer-readable medium may include a non-transient computer-readable medium, a random access memory (random access memory, RAM), a read-only memory (read-only memory, ROM), an electrically erasable programmable read-only memory (electrically EPROM, EEPROM), a CD-ROM or another optical disc storage, a disk storage medium or another magnetic storage device, or any other medium that can be used to carry or store expected program code in an instruction or data structure form and can be accessed by a computer.

According to a seventh aspect, an embodiment of this application provides a computer program product including computer program code or instructions. When the computer program product runs on a computer, the computer is enabled to implement the method according to any one of the first aspect and the possible designs of the first aspect, or any one of the second aspect and the possible designs of the second aspect.

According to an eighth aspect, this application further provides a chip. The chip is coupled to a memory, and is configured to read and execute program instructions stored in the memory, to implement the method according to any one of the first aspect and the possible designs of the first aspect, or any one of the second aspect and the possible designs of the second aspect.

For the third aspect to the eighth aspect and technical effects that can be achieved in the third aspect to the eighth aspect, refer to descriptions of technical effects that can be achieved in the possible solutions in the first aspect or the second aspect. Details are not described herein again.

DESCRIPTION OF EMBODIMENTS

Figure 1:
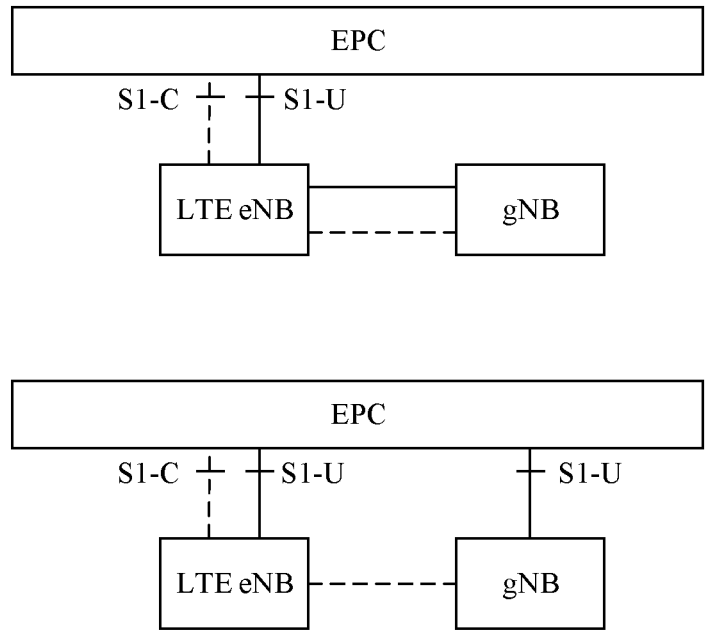
FIG. 1 is a schematic diagram of a DC architecture according to this application.

The following further describes this application in detail with reference to accompanying drawings.

Embodiments of this application provide a communication method for a dual connectivity system and a communication apparatus, to support relaxing RRM measurement when an SCG is deactivated, so as to reduce power consumption of a terminal device. The method and the apparatus of this application are based on a same technical concept. The method and the apparatus have similar principles for resolving problems. Therefore, for implementation of the apparatus and the method, refer to each other. Details of repeated parts are not described again.

In the following, some terms in this application are described, to help a person skilled in the art have a better understanding.

(1) A terminal device is a device that provides voice and/or data connectivity for a user. The terminal device may also be referred to as user equipment (user equipment, UE), a mobile station (mobile station, MS), a mobile terminal (mobile terminal, MT), or the like.

For example, the terminal device may be a hand-held device or a vehicle-mounted device that has a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

(2) A network device is a device that connects a terminal device to a wireless network in a communication system. The network device is a node in a radio access network, and may also be referred to as a base station or a radio access network (radio access network, RAN) node (or device).

Currently, for example, the base station is a gNB (gNB), an evolved NodeB (evolved NodeB, eNB), a transmission reception point (transmission reception point, TRP), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), or a baseband unit (baseband unit, BBU).

In addition, in a network structure, the base station may include a central unit (central unit, CU) node and a distributed unit (distributed unit, DU) node. In this structure, protocol layers of an eNB in a long term evolution (long term evolution, LTE) system are split. Functions of some protocol layers are centrally controlled by the CU, functions of some or all of remaining protocol layers are distributed in the DU, and the CU centrally controls the DU.

(3) Dual connectivity/Carrier aggregation (dual connectivity/carrier aggregation, DC/CA).

To improve spectral efficiency and a user throughput of a system, a CA technology and a DC technology are currently introduced. The CA means that UE may perform uplink and downlink communication simultaneously in (on) a plurality of cells (carriers), to support high-speed data transmission. Among the plurality of cells, one is a primary cell (primary cell, PCell), and the others are secondary cells (secondary cells, SCells).

The DC supports two base stations in simultaneously providing data transmission services for a UE. One base station (a base station in which the PCell is located) is a master base station, and the master base station (which may be referred to as a master station for short) may also be referred to as a master node (Master Node, MN). Another base station (a base station in which a PSCell is located) is a secondary base station, and the secondary base station (which may be referred to as a secondary station for short) may also be referred to as a secondary node (SN). The master base station is a control plane anchor. To be specific, the UE establishes an RRC connection to the master base station, the master base station establishes a control plane connection to a core network, and an RRC message is transmitted between the master base station and the UE. In a subsequent enhanced technology, some RRC messages (for example, measurement configuration information and a measurement report) may also be transmitted between the secondary base station and the UE. It may be understood that the base station herein is merely an example, and may be an independent base station, a DU, or another device having a protocol stack. In the DC, a plurality of serving cells in the master base station form a master cell group (master cell group, MCG), including one PCell and optionally one or more SCells. A plurality of serving cells in the secondary base station form a secondary cell group (secondary cell group, SCG), including one PSCell and optionally one or more SCells.

DC architecture may include but are not limited to the following four types.

Type 1: EN-DC (E-UTRA-NR Dual Connectivity). As shown in FIG. 1, a long term evolution (long term evolution, LTE) base station (for example, an eNB) serves as an MN, which is also referred to as an anchor (anchor), and a new radio (new radio, NR) base station (for example, a gNB) serves as an SN, to perform DC. Both the MN and the SN are connected to a 4G core network (evolved packet core, EPC), to provide air interface transmission resources for data between UE and the EPC.

Figure 2:
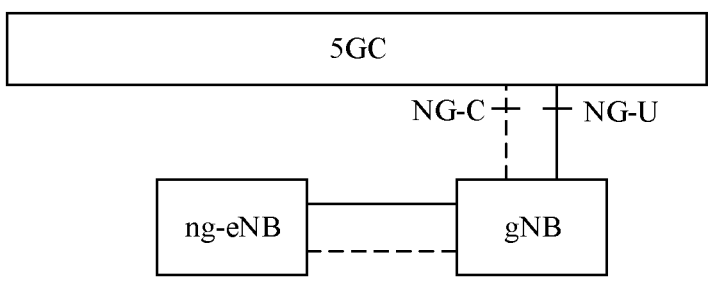
FIG. 2 is a schematic diagram of another DC architecture according to this application.
Figure 2:
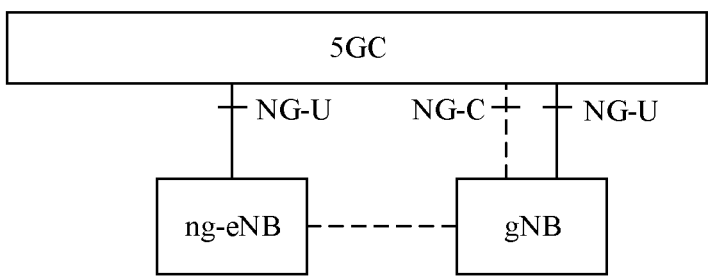

Type 2: NE-DC (NR-E-UTRA Dual Connectivity). As shown in FIG. 2, an NR base station (for example, a gNB) serves as an MN, and an LTE base station (for example, an ng-eNB) serves as an SN. Both the MN and the SN are connected to a 5G core network (5G core, 5GC), to provide air interface transmission resources for data between UE and the 5GC.

Figure 3:
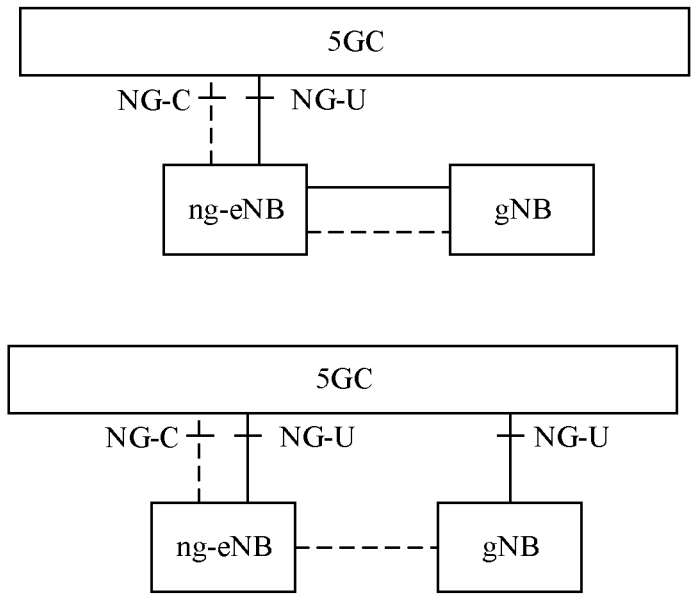
FIG. 3 is a schematic diagram of still another DC architecture according to this application.

Type 3: NGEN-DC (NG-RAN E-UTRA-NR Dual Connectivity). As shown in FIG. 3, an LTE base station (for example, an ng-eNB) serves as an MN, and an NR base station (for example, a gNB) serves as an SN, to perform DC. Both the MN and the SN are connected to a 5GC, to provide air interface transmission resources for data between UE and the 5GC.

Type 4: in addition to the foregoing three types of LTE-NR DC, 5G further supports NR-NR DC (NR-DC). To be specific, both an MN and an SN are NR base stations, and both the MN and the SN are connected to a 5GC.

It should be noted that, based on the foregoing DC architectures, a multi-connectivity case may exist. In a multi-connectivity system, at least three base stations can simultaneously provide data transmission services for a UE, where one base station is a master base station, and the other base stations are secondary base stations. Specifically, in the multi-connectivity system, for a structure of a connection between the master station and any secondary station, refer to the foregoing four architectures. Details are not described herein again.

(4) RRM measurement is mobility measurement. Mobility management is an important part in wireless mobile communication. The mobility management is a general term of related content for ensuring continuity of a communication link between a network and a terminal device irrespective of movement of the terminal device. Based on states of the terminal device, the mobility management may be roughly classified into two parts: mobility management in an idle state/inactive state (RRC_IDLE/RRC_INACTIVE state) and mobility management in a connected state (RRC_CONNECTED state). The mobility management in the idle state or the inactive state mainly refers to a cell selection/reselection (cell selection/reselection) process. The mobility management in the connected state mainly refers to cell handover (handover). Both the cell selection/reselection and the handover are performed based on measurement results. Therefore, the mobility measurement is a basis of the mobility management. The RRM measurement may be classified into two parts: physical layer measurement (layer 1 measurement) and radio resource control (radio resource control, RRC) layer measurement (layer 3 measurement).

(5) Relaxing RRM measurement may be understood as reducing a quantity of RRM measurement objects, or reducing a quantity of RRM measurements. Relaxing SCG RRM measurement in this application is a specific example of relaxing the RRM measurement. Relaxing the SCG RRM measurement refers to relaxing RRM measurement on an SCG, and may include relaxing RRM measurement on a frequency of a serving cell in the SCG or a frequency of a neighboring cell in the SCG, or the like. Relaxing the RRM measurement on the frequency of the serving cell in the SCG or the frequency of the neighboring cell in the SCG is reducing a quantity of to-be-measured frequencies of serving cells in the SCG or a quantity of to-be-measured frequencies of neighboring cells in the SCG.

(6) SCG deactivation or SCG suspend (SCG deactivation/SCG suspend): When a service of UE on an SN side is inactive or has a low requirement for a data transmission speed, the UE receives a deactivation/suspend command from a network device, and the UE temporarily deactivates/suspends an SCG. Specific operations include that the UE does not monitor PDCCHs of a PSCell and an SCell in the SCG, the UE does not receive data on physical downlink shared channels (physical downlink shared channels, PDSCHs) of the PSCell and the SCell in the SCG, and the UE does not send data on physical uplink shared channels (physical uplink shared channels, PUSCHs) of the PSCell and the SCell in the SCG. However, when the service of the UE on the SN side is active or has a high requirement for the data transmission speed, the UE receives an activation/restoration command from the network device, and restores monitoring on the PDCCHs of the PSCell and the SCell in the SCG, receiving of the data on the PDSCHs of the PSCell and the SCell in the SCG, sending of the data on the PUSCHs of the PSCell and the SCell in the SCG, and the like. This saves power for the UE in an inactive state.

(7) The term "and/or" describes an association relationship for describing associated objects and indicates that three relationships may exist. For example, A and/or B may indicate the following three cases: Only A exists, both A and B exist, and only B exists. The character "/" generally indicates an "or" relationship between the associated objects.

In embodiments of this application, "at least one" means one or more, and "a plurality of" means two or more than two. The character "/" generally indicates an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In the descriptions of this application, terms such as "first" and "second" are only for distinction and description, but cannot be understood as indicating or implying relative importance, or as indicating or implying an order.

It should be noted that, with continuous development of technologies, the terms in embodiments of this application may change, but all of the terms shall fall within the protection scope of this application.

To describe the technical solutions in embodiments of this application more clearly, the following describes in detail, with reference to the accompanying drawings, a communication method for a dual connectivity system and a communication apparatus that are provided in embodiments of this application.

Figure 4:
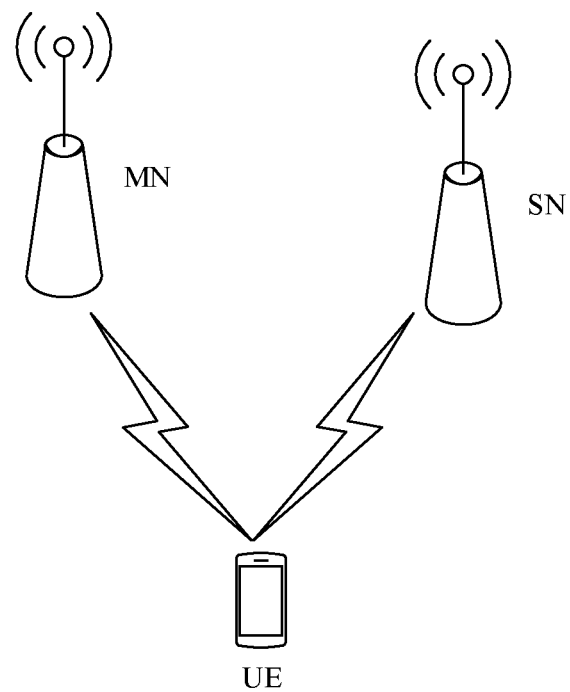
FIG. 4 is a schematic diagram of an architecture of a communication system according to this application.

FIG. 4 shows an architecture of a possible communication system to which a communication method for a dual connectivity system according to an embodiment of this application is applicable. The communication system is a dual connectivity system. In the architecture of the communication system, at least one terminal device and at least two network devices may be included. Only one terminal device and two network devices are used as an example in FIG. 4. The terminal device (UE) and the two network devices (an MN and an SN) shown in FIG. 4 are in a DC relationship. For an architecture of a connection between the two network devices, refer to the foregoing four DC architectures. It should be noted that the architecture of the connection between the two network devices in this application is not limited to the foregoing four DC architectures, and the architecture of the connection between the two network devices may alternatively be another DC architecture that will appear in future communication development. It should be understood that FIG. 4 is merely an example for description, and quantities of terminal devices and network devices that are included in the communication system and categories or types of included devices are not specifically limited.

It should be noted that the communication system shown in FIG. 4 in this application may be a 5th generation (5th Generation, 5G) communication system, a future 6th generation communication system, another evolved communication system, a long term evolution (Long Term Evolution, LTE) communication system, or the like. This is not limited in this application.

Figure 5:
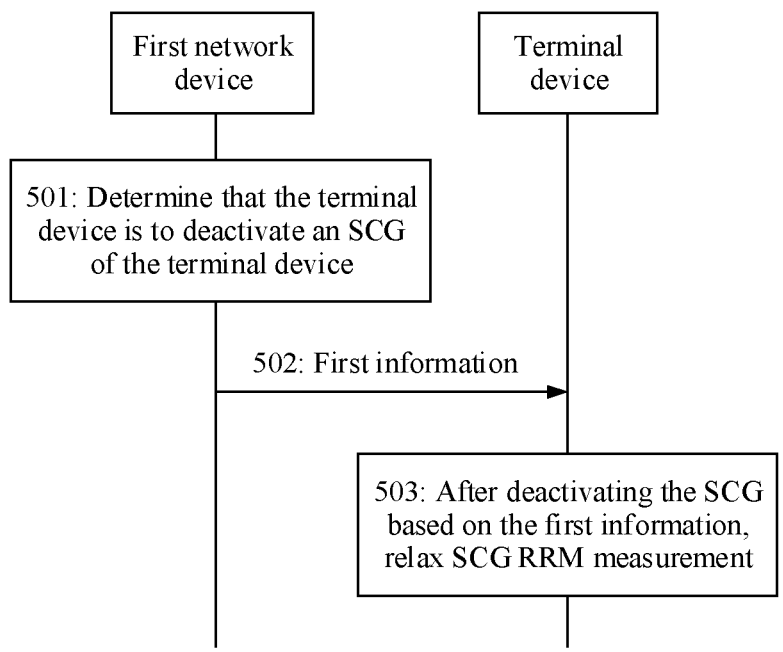
FIG. 5 is a flowchart of a communication method for a dual connectivity system according to this application.

Based on the foregoing embodiments, a communication method for a dual connectivity system according to an embodiment of this application is applicable to the communication system shown in FIG. 4. Refer to FIG. 5. A specific procedure of the method includes the following steps.

Step 501: A first network device determines that a terminal device is to deactivate an SCG of the terminal device, where the first network device is a master station (for example, an MN) or a secondary station (for example, an SN) of the terminal device.

Step 502: The first network device sends first information to the terminal device, where the first information indicates the terminal device to deactivate the SCG of the terminal device, to enable the terminal device to relax SCG RRM measurement after deactivating the SCG.

The first information may be a media access control (medium access control, MAC) control element (control element, CE) (MAC CE), physical layer downlink control information (downlink control information, DCI), or a radio resource control (radio resource control, RRC) message. Alternatively, the first information may be included in a MAC CE, physical layer DCI, or an RRC message sent by the first network device.

Step 503: After deactivating the SCG based on the first information, the terminal device relaxes the SCG RRM measurement.

The SCG RRM measurement may include RRM measurement on the SCG, RRM measurement on a frequency of a serving cell in the SCG or a frequency of a neighboring cell in the SCG, or RRM measurement configured by the secondary station for the terminal device. The RRM measurement configured by the secondary station for the terminal device may be understood as RRM measurement on an SCG configured by the secondary station for the terminal device. The RRM measurement configured by the secondary station for the terminal device may also be understood as RRM measurement performed for mobility management on the UE in the SCG.

In an optional implementation, the terminal device may receive second information from the first network device, where the second information indicates to relax the RRM measurement on the SCG, the RRM measurement on the frequency of the serving cell in the SCG or the frequency of the neighboring cell in the SCG, or the RRM measurement configured by the secondary station for the terminal device.

For example, the second information and the first information may be included in different messages sent by the first network device to the terminal device. Alternatively, the second information and the first information may be included in a same message, for example, the RRC message, that is sent by the first network device to the terminal device. For another example, when the first information is the RRC message, the second information may alternatively be directly included in the first information.

For still another example, the second information may be preset. In this case, the terminal device does not need to receive the second information from the first network device, and the terminal device may directly obtain the second information locally.

It should be noted that when the second information and the first information exist independently, that is, when the terminal device separately obtains the first information and the second information via different messages, the first network device may send the second information before sending the first information to the terminal device (that is, before step 503), may send the second information after sending the first information to the terminal device (that is, after step 503), or may simultaneously send the first information and the second information. This is not limited in this application.

In another optional implementation, the terminal device obtains a first measurement configuration, where the first measurement configuration includes: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary station for the terminal device.

For example, the first measurement configuration may be preset, and the terminal device may directly obtain the first measurement configuration locally. Alternatively, the first measurement configuration may be received by the terminal device from the first network device. Specifically, if the first measurement configuration is received by the terminal device from the first network device, the first measurement configuration and the first information may be included in different messages sent by the first network device to the terminal device; or the first measurement configuration and the first information may be included in the same message, for example, the RRC message, that is sent by the first network device to the terminal device. Optionally, when the first information is the RRC message, the first measurement configuration may alternatively be directly included in the first information.

It should be noted that when the first measurement configuration and the first information exist independently, that is, when the terminal device separately obtains the first measurement configuration and the first information via different messages, the first network device may send the first measurement configuration before sending the first information to the terminal device (that is, before step 503), may send the first measurement configuration after sending the first information to the terminal device (that is, after step 503), or may simultaneously send the first measurement configuration and the first information. This is not limited in this application.

In an example, when the first measurement configuration includes the configuration information for relaxing the RRM measurement on the SCG, the configuration information for relaxing the RRM measurement on the SCG may include one or more of the following: an extended measurement periodicity, an extended measurement periodicity of a secondary cell SCell in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG. For example, in one case, the configuration information for relaxing the RRM measurement on the SCG may include the extended measurement periodicity of the secondary cell SCell in the SCG and the indication information indicating to reduce the quantity of measurement frequencies or cells.

The indication information indicating to reduce the quantity of measurement frequencies or cells may indicate a reduced quantity of to-be-measured frequencies or to-be-measured cells, which may be specifically reflected by a fact that a quantity of to-be-measured frequencies or to-be-measured cells this time is less than a quantity of to-be-measured frequencies or to-be-measured cells last time.

In another example, when the first measurement configuration includes the configuration information for relaxing the RRM measurement on the frequency of the serving cell in the SCG or the frequency of the neighboring cell in the SCG, the configuration information for relaxing the RRM measurement on the frequency of the serving cell in the SCG or the frequency of the neighboring cell in the SCG may include one or more of the following: an extended measurement periodicity of the frequency of the serving cell in the SCG or the frequency of the neighboring cell in the SCG, indication information indicating to reduce a quantity of frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG. For example, the configuration information for relaxing the RRM measurement on the frequency of the serving cell in the SCG or the frequency of the neighboring cell in the SCG may include the extended measurement periodicity of the frequency of the serving cell in the SCG or the frequency of the neighboring cell in the SCG, and the indication information indicating to reduce the quantity of frequencies of serving cells in the SCG or frequencies of neighboring cells in the SCG or cells. The indication information indicating to reduce the quantity of frequencies of serving cells in the SCG or frequencies of neighboring cells in the SCG or cells may indicate a reduced quantity of to-be-measured frequencies of serving cells in the SCG or frequencies of neighboring cells in the SCG or cells, which may be specifically reflected by a fact that a quantity of to-be-measured frequencies of serving cells in the SCG or frequencies of neighboring cells in the SCG or cells this time is less than a quantity of to-be-measured frequencies of serving cells in the SCG or frequencies of neighboring cells in the SCG or cells last time.

In still another example, when the first measurement configuration includes the configuration information for relaxing the RRM measurement configured by the secondary station for the terminal device, the configuration information for relaxing the RRM measurement configured by the secondary station for the terminal device may include one or more of the following: an extended measurement periodicity of a neighboring cell in the SCG configured by the secondary station for the terminal device, an extended measurement periodicity of a serving cell in the SCG configured by the secondary station for the terminal device, indication information indicating to reduce a quantity of measurement frequencies or cells configured by the secondary station for the terminal device, indication information indicating to measure a serving cell in the SCG configured by the secondary station for the terminal device as a neighboring cell, indication information indicating not to measure a neighboring cell or a frequency of the neighboring cell in the SCG configured by the secondary station for the terminal device, or indication information indicating not to report a measurement result of a neighboring cell or a frequency of the neighboring cell in the SCG configured by the secondary station for the terminal device. The indication information indicating to reduce the quantity of measurement frequencies or cells configured by the secondary station for the terminal device may indicate a reduced quantity of to-be-measured frequencies or to-be-measured cells, which may be specifically reflected by a fact that a quantity of to-be-measured frequencies or to-be-measured cells this time is less than a quantity of to-be-measured frequencies or to-be-measured cells last time.

Correspondingly, in step 503, when relaxing the SCG RRM measurement, the terminal device may specifically perform one or more of the following operations: extending measurement periodicities of all or a part of frequencies of serving cells in the SCG, extending measurement periodicities of all or a part of frequencies of neighboring cells in the SCG, extending a measurement periodicity of the serving cell and/or the neighboring cell in the SCG, reducing the quantity of to-be-measured frequencies of serving cells in the SCG or frequencies of neighboring cells in the SCG, reducing the quantity of to-be-measured cells, measuring the SCG as the neighboring cells, skipping performing RRM measurement configured by the secondary station for the terminal device, skipping measuring the neighboring cell or the frequency of the neighboring cell in the SCG, or skipping reporting the measurement result of the neighboring cell or the frequency of the neighboring cell in the SCG.

In an optional implementation, the terminal device directly relaxes the SCG RRM measurement after deactivating the SCG.

In another optional implementation, that the terminal device relaxes the SCG RRM measurement after deactivating the SCG may specifically be: The terminal device relaxes the SCG RRM measurement when a trigger condition is met. The trigger condition may be that a signal quality change of a PSCell in the SCG in a specified period is not greater than a first threshold, and/or signal quality of the PSCell in the specified period is greater than a second threshold. Conditions included in the trigger condition may be understood as that the terminal device is in low mobility, or the terminal device is located in a center of the PSCell cell or is not located at an edge of the PSCell. For this case, FIG. 6A and FIG. 6B may show a procedure of relaxing the SCG RRM measurement in a scenario in which the trigger condition for relaxing the SCG RRM measurement exists.

Figure 6A:
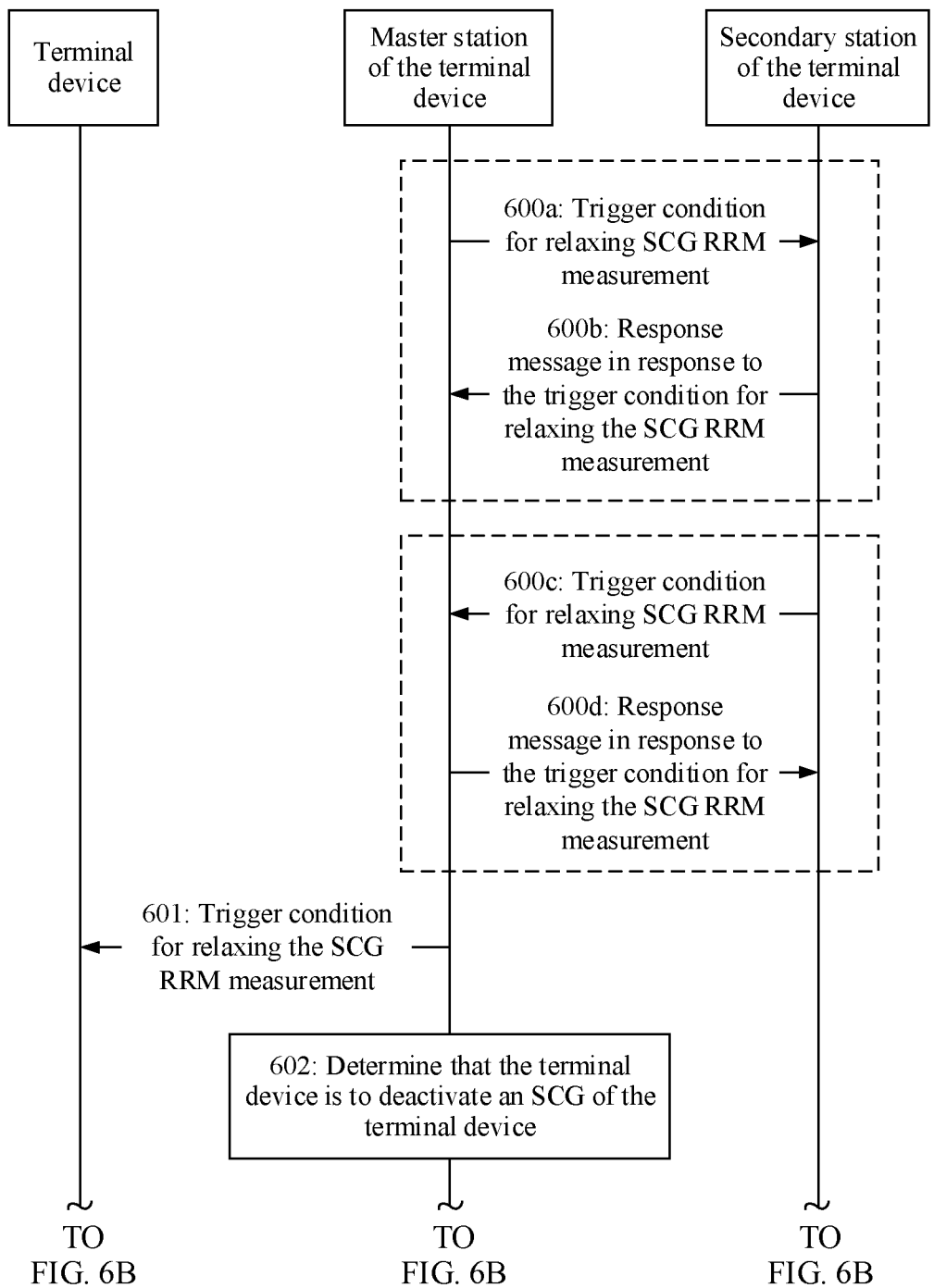
FIG. 6A and FIG. 6B are a schematic diagram of an exchange of a trigger condition for relaxing SCG RRM measurement according to this application.

Specifically, in a case in which the terminal device relaxes the SCG RRM measurement only when the trigger condition is met, the terminal device receives, from a second network device, the trigger condition for relaxing the SCG RRM measurement, that is, the terminal device performs step 601 shown in FIG. 6A. The second network device is the master station or the secondary station. In other words, the second network device and the first network device may be the same, or may be different. It should be noted that step 601 in FIG. 6A is merely shown by using an example in which the second network device is the master station. It should be understood that an entity for sending, to the terminal device, the trigger condition for relaxing the SCG RRM measurement in step 601 may alternatively be the secondary station, which is not shown in the figure. In a case in which the master station sends, to the terminal device, the trigger condition for relaxing the SCG RRM measurement, the master station may send, to the terminal device on a signaling radio bearer 1 (signaling radio bearer 1, SRB 1), the trigger condition for relaxing the SCG RRM measurement. In a case in which the secondary station sends, to the terminal device, the trigger condition for relaxing the SCG RRM measurement, the secondary station may send, to the terminal device on an SRB 3, the trigger condition for relaxing the SCG RRM measurement.

Figure 6B:
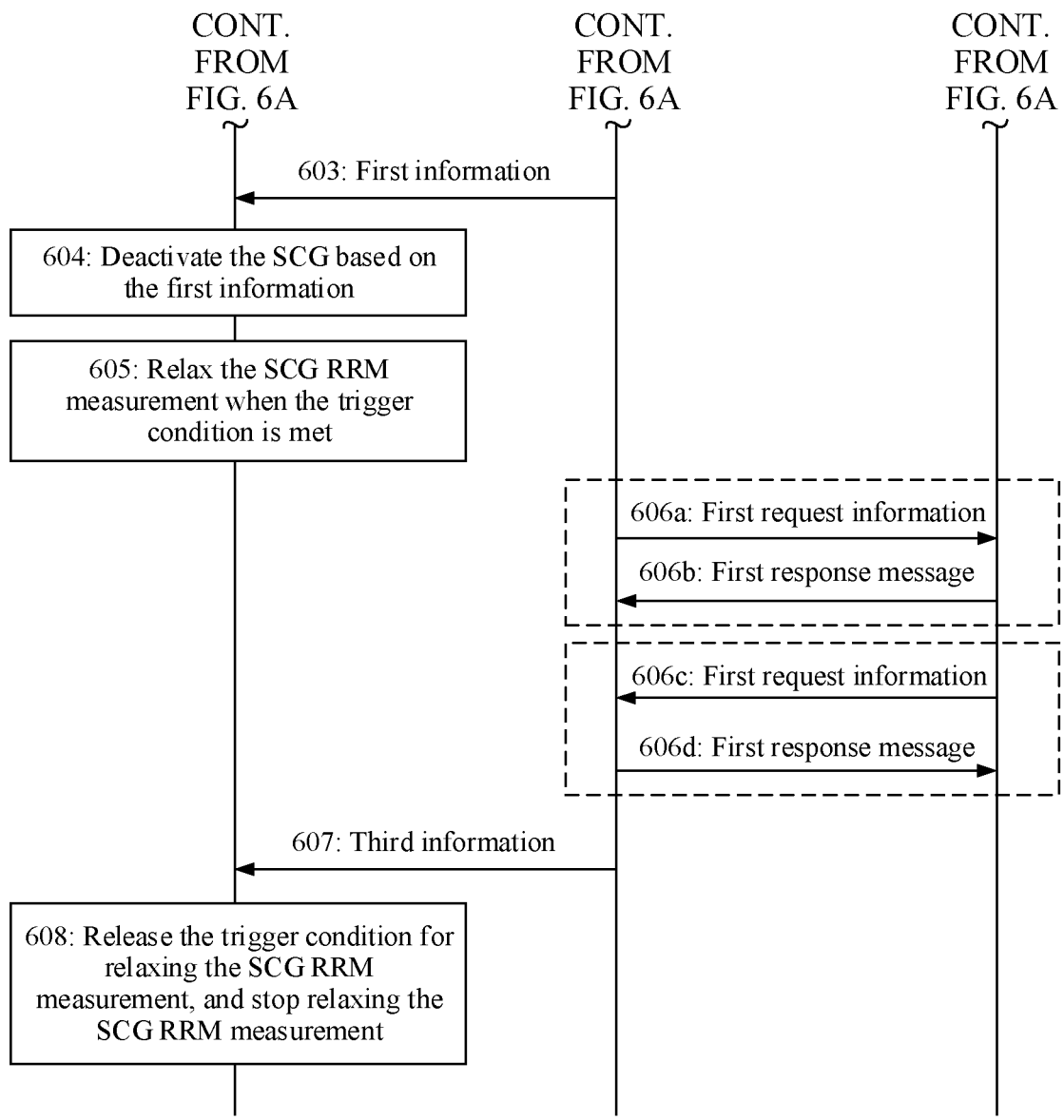

In an optional implementation, in a case in which the terminal device obtains the trigger condition in step 601, after the terminal device deactivates the SCG, the terminal device may relax the SCG RRM measurement when the trigger condition is met, that is, the terminal device performs step 605 in FIG. 6B. Specifically, before step 605, the first network device first determines that the terminal device is to deactivate the SCG of the terminal device, that is, performs step 602. In FIG. 6A and FIG. 6B, only an example in which the first network device is the master station of the terminal device is used, and a case in which the first network device is the secondary station of the terminal device is not shown herein. The first network device sends the first information to the terminal device, that is, performs step 603. Then, the terminal device deactivates the SCG based on the first information. Steps 602 and 603 in FIG. 6A and FIG. 6B are the same as steps 501 and 502 in FIG. 5, and step 503 in which the terminal device deactivates the SCG based on the first information. For content, refer to each other. Details are not described herein again.

It should be noted that a sequence of some steps in FIG. 6A and FIG. 6B is merely an example, and constitutes no limitation on a sequence of the steps. For example, a sequence of step 601 and steps 602 to 604 constitutes no limitation on a sequence in FIG. 6A and FIG. 6B. Optionally, step 601 may be performed after step 602 to step 604 that are as a whole, or after any one of step 602 to step 604. This is not limited in this application. It should be understood that, if a change in a time sequence relationship between steps in FIG. 6A and FIG. 6B does not affect an implementation effect of the solution, the time sequence relationship between the steps is not limited. Other examples are not enumerated one by one herein.

In an optional implementation, before the terminal device receives, from the second network device (the master station or the secondary station), the trigger condition for relaxing the SCG RRM measurement, the trigger condition for relaxing the SCG RRM measurement is exchanged between the master station of the terminal device and the secondary station of the terminal device.

In a possible implementation, a process of exchanging the trigger condition for relaxing the SCG RRM measurement may be initiated by the master station. Specifically, the master station sends, to the secondary station, the trigger condition for relaxing the SCG RRM measurement, and the secondary station sends, to the master station, a response message in response to the trigger condition for relaxing the SCG RRM measurement, where the response message is for acknowledging or modifying the trigger condition for relaxing the SCG RRM measurement. For example, this is a process shown in step 600a and step 600b in FIG. 6A. Optionally, the master station may send, to the secondary station via an SN modification request (SN modification request) message, the trigger condition for relaxing the SCG RRM measurement, and the secondary station may send, to the master station via an SN modification request acknowledge (SN modification request acknowledge) message, the response message in response to the trigger condition for relaxing the SCG RRM measurement.

In another possible implementation, a process of exchanging the trigger condition for relaxing the SCG RRM measurement may be initiated by the secondary station. Specifically, the secondary station sends, to the master station, the trigger condition for relaxing the SCG RRM measurement, and the master station sends, to the secondary station, a response message in response to the trigger condition for relaxing the SCG RRM measurement, where the response message is for acknowledging or modifying the trigger condition for relaxing the SCG RRM measurement. For example, this is a process shown in step 600c and step 600d in FIG. 6A. Optionally, the secondary station may send, to the master station via an SN modification required (SN modification required) message, the trigger condition for relaxing the SCG RRM measurement, and the master station may send, to the master station via an SN modification confirm (SN modification confirm) message, the response message in response to the trigger condition for relaxing the SCG RRM measurement.

In an optional implementation, a release of the trigger condition for relaxing the SCG RRM measurement may further be exchanged between the master station of the terminal device and the secondary station of the terminal device.

In a possible implementation, a process of exchanging the release of the trigger condition for relaxing the SCG RRM measurement may be initiated by the master station. Specifically, the master station sends first request information to the secondary station, where the first request information is for requesting to release the trigger condition for relaxing the SCG RRM measurement. The secondary station sends, to the master station, a first response message in response to the first request message. For example, this is a process shown in step 606a and step 606b in FIG. 6B. Optionally, the master station may send the first request information to the secondary station via the SN modification request message, and the secondary station may send the first response message to the master station via the SN modification request acknowledge message.

In another possible implementation, a process of exchanging the release of the trigger condition for relaxing the SCG RRM measurement may be initiated by the secondary station. Specifically, the secondary station sends first request information to the master station, where the first request information is for requesting to release the trigger condition for relaxing the SCG RRM measurement. The master station sends, to the secondary station, a first response message in response to the first request message. For example, this is a process shown in step 606c and step 606d in FIG. 6B. Optionally, the secondary station may send the first request information to the master station via the SN modification required message, and the master station may send the first response message to the secondary station via the SN modification confirm message.

Further, after steps 606a and 606b or steps 606c and 606d, the master station or the secondary station sends third information to the terminal device, where the third information indicates to release the trigger condition for relaxing the SCG RRM measurement. For example, this is step 607 shown in FIG. 6B. Then, the terminal device releases the trigger condition for relaxing the SCG RRM measurement, and stops relaxing the SCG RRM measurement. For example, this is step 608 shown in FIG. 6B. It should be noted that step 607 in FIG. 6B is merely shown by using an example in which the master station sends the third information to the terminal device. It should be understood that an entity for sending the third information to the terminal device in step 607 may alternatively be the secondary station, which is not shown in the figure. In a case in which the master station sends the third information to the terminal device, the master station may send the third information to the terminal device on the SRB 1. In a case in which the secondary station sends the third information to the terminal device, the secondary station may send the third information to the terminal device on the SRB 3.

It should be noted that, when the secondary station provides a service transmission service for the terminal device, the SCG of the terminal device needs to be activated, to ensure that the terminal device restores a service in the SCG. In this case, the trigger condition for relaxing the SCG RRM measurement needs to be released. In this case, the terminal device may perform step 608. In another case, if no trigger condition is required to restrict relaxation of the SCG RRM measurement, the terminal device may only release the trigger condition for relaxing the SCG RRM measurement, and does not need to stop relaxing the SCG RRM measurement. In this case, an operation performed by the terminal device is different from the operation in step 608. The operation of only releasing the trigger condition for relaxing the SCG RRM measurement is not shown in FIG. 6A and FIG. 6B. In this case, after the terminal device releases the trigger condition for relaxing the SCG RRM measurement, the terminal device directly relaxes the SCG RRM measurement when the SCG is deactivated.

As shown in FIG. 6A and FIG. 6B, the trigger condition for relaxing the SCG RRM measurement is exchanged between the master station and the secondary station, and then the master station or the secondary station delivers the trigger condition for relaxing the SCG RRM measurement, so that more refined control can be implemented on the relaxation of the SCG RRM measurement when the SCG is deactivated.

It should be noted that, in the procedure shown in FIG. 5, the terminal device may directly relax the SCG RRM measurement after deactivating the SCG. If a constraint condition is given to the terminal device, that is, in a case in which the terminal device relaxes the SCG RRM measurement only when the trigger condition is met, in FIG. 6A and FIG. 6B, the terminal device may relax the SCG RRM measurement only when the trigger condition is met.

In an optional implementation, in step 501, when the first network device is the master station of the terminal device, the first network device receives fourth information from the secondary station, where the fourth information indicates that a service of the terminal device in the SCG is in a low-active state. Further, a specific method in which the first network device performs step 501 may be: The first network device determines, based on the fourth information, that the terminal device is to deactivate the SCG.

In another optional implementation, in step 501, when the first network device is the master station of the terminal device, a specific method in which the first network device performs step 501 may be: The first network device determines, based on a traffic volume of the terminal device in the SCG, that the terminal device is to deactivate the SCG. In this case, the first network device may learn of a status of the service in the SCG. When determining that the service in the SCG is in the low-active state, the first network device may directly determine that the terminal device is to deactivate the SCG of the terminal device.

In still another optional implementation, in step 501, when the first network device is the secondary station of the terminal device, a specific method in which the first network device performs step 501 may be: When determining that a service of the terminal device in the SCG is in a low-active state, the first network device determines that the terminal device is to deactivate the SCG. Then, the first network device sends fifth information to the master station, where the fifth information indicates that the service of the terminal device in the SCG is in the low-active state.

That a service in the SCG is in a low-active state may be indicated by one or more of the following information: a data amount of the terminal device is less than a third threshold, a service of a protocol data unit (protocol data unit, PDU) session of the terminal device is in a low-active state, a quality of service (quality of service, QoS) flow—level service is in a low-active state, a service of an SN terminated bearer (SN terminated bearer) of the terminal device is in a low-active state, and a service of an SCG bearer (SCG bearer) is in a low-active state. Specifically, that a service is in a low-active state may be understood as that the traffic volume is less than a specified threshold.

In the communication method for a dual connectivity system according to this embodiment of this application, relaxing the SCG RRM measurement can be supported when the SCG is deactivated, to reduce power consumption of the terminal device.

Currently, in a DC scenario, procedures such as an SN addition (PSCell addition and the like) procedure/an SN change (including intra-SN PSCell modification, inter-SN PSCell change, and the like) procedure may be included. Conditional handover (conditional handover, CHO) may be used to support a conditional PSCell addition/change (conditional PSCell addition/change, CPAC) procedure. The conditional PSCell change (conditional PSCell change, CPC) may include an intra-SN (intra-SN) conditional PSCell change and an inter-SN (inter-SN) conditional PSCell change. The intra-SN conditional PSCell change can be initiated only by the SN, and the inter-SN conditional PSCell change can be initiated by the MN or the SN. The conditional PSCell addition (conditional PSCell addition, CPA) procedure can be initiated only by the MN. A CPAC configuration may be sent to the UE via an RRC reconfiguration message on the SRB 1. In a CPAC procedure without MN involvement (without MN involvement), for example, in the intra-SN conditional PSCell change procedure, in addition to the SRB 1, the SN may directly send a CPC configuration on the SRB 3. In an actual scenario, there may be a case in which an SCG of a terminal device is deactivated and a CPAC configuration is configured for the terminal device. However, currently, in the foregoing scenario, behavior of the terminal device is not specified. Based on this, this application provides another communication method for a dual connectivity system, to specify behavior of a terminal device in a scenario in which an SCG of the terminal device is in an inactive state and a CPC is configured for the terminal device. Specifically, the method may include the following steps.

In a case in which the SCG of the terminal device is in the inactive state, when the terminal device performs a primary secondary cell change, the terminal device performs one of the following operations:

The terminal device performs the PSCell change when determining a candidate PSCell or SCG that meets a change condition, and keeps the SCG in the inactive state after accessing a changed PSCell;

the terminal device performs the PSCell change when determining a candidate PSCell or SCG that meets a change condition, and keeps the SCG in an initial state of the SCG after accessing a changed PSCell; or the terminal device stops performing the primary secondary cell PSCell change procedure.

In the foregoing method, an SCG deactivation procedure and a CPAC procedure of the terminal device may be combined, to save power of the terminal device during the CPAC procedure. Alternatively, a CPAC procedure can still be performed when the SCG is deactivated, to ensure robustness of SCG addition or an SCG change.

Figure 7:
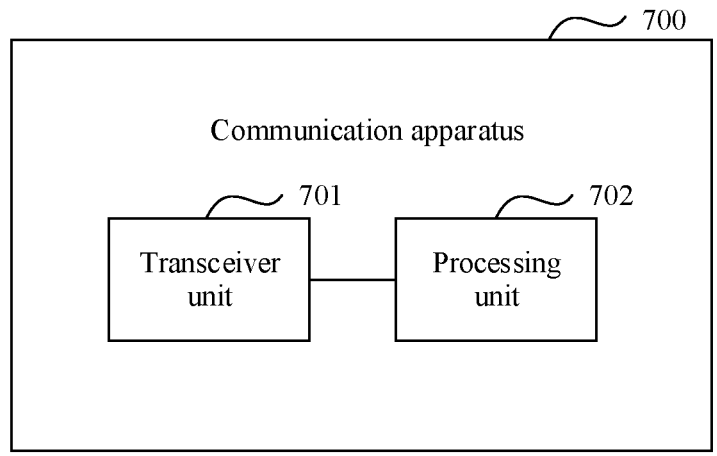
FIG. 7 is a schematic diagram of a structure of a communication apparatus according to this application.

Based on the foregoing embodiments, an embodiment of this application further provides a communication apparatus. The communication apparatus has a capability of a dual-connectivity system. As shown in FIG. 7, the communication apparatus 700 may include a transceiver unit 701 and a processing unit 702. The transceiver unit 701 is configured to receive information (a message or data) or send information (a message or data) for the communication apparatus 700, and the processing unit 702 is configured to control and manage an action of the communication apparatus 700. The processing unit 702 may further control steps performed by the transceiver unit 701.

For example, the communication apparatus 700 may be the terminal device in the foregoing embodiments, and may be specifically a processor, a chip, a chip system, a functional module, or the like in the terminal device. Alternatively, the communication apparatus 700 may be the first network device in the foregoing embodiments, and may be specifically a processor, a chip, a chip system, a functional module, or the like in the first network device.

In an embodiment, when the communication apparatus 700 is configured to implement a function of the terminal device in the embodiment shown in FIG. 5 or FIG. 6A and FIG. 6B, details may be as follows:

The transceiver unit 701 is configured to receive first information from a first network device, where the first information indicates the terminal device to deactivate a secondary cell group SCG of the terminal device. The processing unit 702 is configured to relax SCG radio resource management RRM measurement after deactivating the SCG based on the first information. The first network device is a master station or a secondary station of the terminal device.

Specifically, the SCG RRM measurement includes RRM measurement on the SCG, RRM measurement on a frequency of a serving cell in the SCG or a frequency of a neighboring cell in the SCG, or RRM measurement configured by the secondary station for the terminal device.

In an optional implementation, the transceiver unit 701 is further configured to receive second information from the first network device, where the second information indicates to relax the RRM measurement on the SCG, the RRM measurement on the frequency of the serving cell in the SCG or the frequency of the neighboring cell in the SCG, or the RRM measurement configured by the secondary station for the terminal device.

For example, the second information and the first information may be included in a same message sent to the terminal device.

In another optional implementation, the transceiver unit 701 is further configured to obtain a first measurement configuration, where the first measurement configuration includes: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary station for the terminal device.

For example, the first measurement configuration and the first information may be included in the same message sent to the terminal device.

In a specific manner, the configuration information for relaxing the RRM measurement on the SCG may include one or more of the following: an extended measurement periodicity, an extended measurement periodicity of a secondary cell SCell in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG.

In another specific manner, the configuration information for relaxing the RRM measurement on the frequency of the serving cell in the SCG or the frequency of the neighboring cell in the SCG may include one or more of the following: an extended measurement periodicity of the frequency of the serving cell in the SCG or the frequency of the neighboring cell in the SCG, indication information indicating to reduce a quantity of frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG.

In still another specific manner, the configuration information for relaxing the RRM measurement configured by the secondary station for the terminal device may include one or more of the following: an extended measurement periodicity of a neighboring cell in the SCG configured by the secondary station for the terminal device, an extended measurement periodicity of a serving cell in the SCG configured by the secondary station for the terminal device, indication information indicating to reduce a quantity of measurement frequencies or cells configured by the secondary station for the terminal device, indication information indicating to measure a serving cell in the SCG configured by the secondary station for the terminal device as a neighboring cell, indication information indicating not to measure a neighboring cell or a frequency of the neighboring cell in the SCG configured by the secondary station for the terminal device, or indication information indicating not to report a measurement result of a neighboring cell or a frequency of the neighboring cell in the SCG configured by the secondary station for the terminal device.

In an example implementation, when relaxing the SCG RRM measurement, the processing unit 702 is specifically configured to perform one or more of the following operations: extending measurement periodicities of all or a part of frequencies of serving cells in the SCG, extending measurement periodicities of all or a part of frequencies of neighboring cells in the SCG, extending a measurement periodicity of the serving cell and/or the neighboring cell in the SCG, reducing the quantity of to-be-measured frequencies of serving cells in the SCG or frequencies of neighboring cells in the SCG, reducing the quantity of to-be-measured cells, measuring the SCG as the neighboring cells, skipping performing RRM measurement configured by the secondary station for the terminal device, skipping measuring the neighboring cell or the frequency of the neighboring cell in the SCG, or skipping reporting the measurement result of the neighboring cell or the frequency of the neighboring cell in the SCG.

In an optional implementation, the transceiver unit 701 is further configured to receive, from a second network device, a trigger condition for relaxing the SCG RRM measurement. Further, when relaxing the SCG RRM measurement, the processing unit 702 is specifically configured to relax the SCG RRM measurement when the trigger condition is met. The second network device is the master station or the secondary station.

Specifically, the trigger condition may be that a signal quality change of a primary secondary cell PSCell in the SCG in a specified period is not greater than a first threshold, and/or signal quality of the PSCell in the specified period is greater than a second threshold.

In an optional implementation, the transceiver unit 701 is further configured to receive third information from the second network device, where the third information indicates to release the trigger condition for relaxing the SCG RRM measurement. The processing unit 702 is further configured to: release the trigger condition for relaxing the SCG RRM measurement, and stop relaxing the SCG RRM measurement.

In another embodiment, when the communication apparatus 700 is configured to implement a function of the first network device (for example, an MN or an SN) in the embodiment shown in FIG. 5 or FIG. 6A and FIG. 6B, details may be as follows:

The processing unit 702 is configured to determine that a terminal device is to deactivate a secondary cell group SCG of the terminal device. The transceiver unit 701 is configured to send first information to the terminal device, where the first information indicates the terminal device to deactivate the SCG, to enable the terminal device to relax SCG radio resource management RRM measurement after deactivating the SCG. The first network device is a master station or a secondary station of the terminal device.

Specifically, the SCG RRM measurement includes RRM measurement on the SCG, RRM measurement on a frequency of a serving cell in the SCG or a frequency of a neighboring cell in the SCG, or RRM measurement configured by the secondary station for the terminal device.

In an optional implementation, the transceiver unit 701 is further configured to send second information to the terminal device, where the second information indicates to relax the RRM measurement on the SCG, the RRM measurement on the frequency of the serving cell in the SCG or the frequency of the neighboring cell in the SCG, or the RRM measurement configured by the secondary station for the terminal device.

For example, the second information and the first information may be included in a same message sent by the first network device to the terminal device.

In another optional implementation, the transceiver unit 701 is further configured to send a first measurement configuration to the terminal device, where the first measurement configuration includes: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary station for the terminal device.

For example, the first measurement configuration and the first information may be included in the same message sent to the terminal device.

In an optional implementation, the transceiver unit 701 is further configured to send, to the terminal device, a trigger condition for relaxing the SCG RRM measurement.

Specifically, the trigger condition may be that a signal quality change of a primary secondary cell PSCell in the SCG in a specified period is not greater than a first threshold, and/or signal quality of the PSCell in the specified period is greater than a second threshold.

In an example, the transceiver unit 701 is further configured to: send, to a second network device, the trigger condition for relaxing the SCG RRM measurement, and receive, from the second network device, a response message in response to the trigger condition for relaxing the SCG RRM measurement, where the response message is for acknowledging or modifying the trigger condition for relaxing the SCG RRM measurement. When the first network device is the master station of the terminal device, the second network device is the secondary station of the terminal device. When the first network device is the secondary station of the terminal device, the second network device is the master station of the terminal device.

In an optional implementation, the transceiver unit 701 is further configured to: send first request information to the second network device, where the first request information is for requesting to release the trigger condition for relaxing the SCG RRM measurement; and receive, from the second network device, a first response message in response to the first request message. When the first network device is the master station of the terminal device, the second network device is the secondary station of the terminal device. When the first network device is the secondary station of the terminal device, the second network device is the master station of the terminal device.

In an optional implementation, the transceiver unit 701 is further configured to send third information to the terminal device, where the third information indicates to release the trigger condition for relaxing the SCG RRM measurement.

In an example, when the first network device is the master station of the terminal device, the transceiver unit 701 is further configured to receive fourth information from the secondary station, where the fourth information indicates that a service of the terminal device in the SCG is in a low-active state. Further, that the processing unit 702 determines that the terminal device is to deactivate the SCG specifically includes: The processing unit 702 is configured to determine, based on the fourth information, that the terminal device is to deactivate the SCG.

In another example, when the first network device is the master station of the terminal device, that the processing unit 702 determines that the terminal device is to deactivate the SCG specifically includes: The processing unit 702 is configured to determine, based on a traffic volume of the terminal device in the SCG, that the terminal device is to deactivate the SCG.

In still another example, when the first network device is the secondary station of the terminal device, that the processing unit 702 determines that the terminal device is to deactivate the SCG specifically includes: The processing unit 702 is configured to: when determining that a service of the SCG is in a low-active state, determine that the terminal device is to deactivate the SCG.

In an optional implementation, the transceiver unit 701 is further configured to send fifth information to the master station, where the fifth information indicates that the service of the terminal device in the SCG is in the low-active state.

Specifically, that a service in the SCG is in a low-active state may include one or more of the following: a data amount of the terminal device is less than a third threshold, a service of a PDU session of the terminal device is in a low-active state, a quality of service flow—level service is in a low-active state, a service of an SN terminated bearer of the terminal device is in a low-active state, and an SCG bearer is in a low-active state.

It should be noted that, in embodiments of this application, division into the units is an example, and is merely a logical function division. During actual implementation, another division manner may be used. Functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in embodiments of this application. The storage medium includes any medium that can store program code, such as a USB flash drive, a removable hard disk, a read-only memory (read-only memory, ROM), a random access memory (random access memory, RAM), a magnetic disk, or a compact disc.

Figure 8:
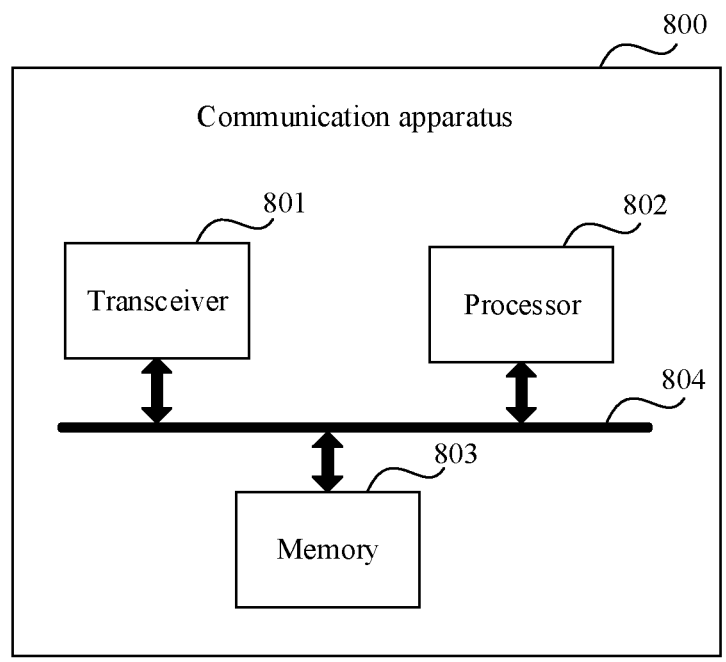
FIG. 8 is a diagram of a structure of a communication apparatus according to this application.

Based on the foregoing embodiments, an embodiment of this application further provides a communication apparatus. The communication apparatus has a capability of a dual-connectivity system. As shown in FIG. 8, the communication apparatus 800 may include a transceiver 801 and a processor 802. Optionally, the communication apparatus 800 may further include a memory 803. The memory 803 may be disposed inside the communication apparatus 800, or may be disposed outside the communication apparatus 800. The processor 802 may control the transceiver 801 to receive and send data.

Specifically, the processor 802 may be a central processing unit (central processing unit, CPU), a network processor (network processor, NP), or a combination of the CPU and the NP. The processor 802 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), a generic array logic (generic array logic, GAL), or any combination thereof.

The transceiver 801, the processor 802, and the memory 803 are connected to each other. Optionally, the transceiver 801, the processor 802, and the memory 803 are connected to each other through a bus 804. The bus 804 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is for representing the bus in FIG. 8, but this does not mean that there is only one bus or only one type of bus.

In an optional implementation, the memory 803 is configured to store a program and the like. Specifically, the program may include program code, and the program code includes computer operation instructions. The memory 803 may include a RAM, and may further include a non-volatile memory (non-volatile memory), for example, one or more disk memories. The processor 802 executes the application program stored in the memory 803, to implement the foregoing function, so as to implement a function of the communication apparatus 800.

For example, the communication apparatus 800 may be the foregoing terminal device or the foregoing first network device.

In an embodiment, when the communication apparatus 800 is configured to implement a function of the terminal device in the embodiment shown in FIG. 5 or FIG. 6A and FIG. 6B, details may be as follows: The transceiver 801 is configured to receive first information from a first network device, where the first information indicates the terminal device to deactivate a secondary cell group SCG of the terminal device; and the processor 802 is configured to relax SCG radio resource management RRM measurement after deactivating the SCG based on the first information, where the first network device is a master station or a secondary station of the terminal device.

The transceiver 801 may be further configured to implement receiving and sending operations of the terminal device in the foregoing embodiments. The processor 802 may be further configured to implement a processing process related to the terminal device in the foregoing embodiments and/or another process of the technical solutions described in this application. Specifically, the processor 802 may further control steps performed by the transceiver 801. For specific content, refer to the foregoing embodiments. Details of repeated parts are not described herein again.

In another embodiment, when the communication apparatus 800 is configured to implement a function of the first network device (for example, an MN or an SN) in the embodiment shown in FIG. 5 or FIG. 6A and FIG. 6B, details may be as follows: The processor 802 is configured to determine that a terminal device is to deactivate a secondary cell group SCG of the terminal device; and the transceiver 801 is configured to send first information to the terminal device, where the first information indicates the terminal device to deactivate the SCG, to enable the terminal device to relax SCG radio resource management RRM measurement after deactivating the SCG, where the first network device is a master station or a secondary station of the terminal device.

The transceiver 801 may be further configured to implement receiving and sending operations of the first network device in the foregoing embodiments. The processor 802 may be further configured to implement a processing process related to the first network device in the foregoing embodiments and/or another process of the technical solution described in this application. Specifically, the processor 802 may further control steps performed by the transceiver 801. For specific content, refer to the foregoing embodiments. Details of repeated parts are not described herein again.

Based on the foregoing embodiments, an embodiment of this application provides a communication system. The communication system may include the terminal device, the first network device (a master station or a secondary station), and the like in the foregoing embodiments.

An embodiment of this application further provides a computer-readable storage medium. The computer-readable storage medium is configured to store a computer program. When the computer program is executed by a computer, the computer may implement the communication method for a dual connectivity system provided in the foregoing method embodiments.

An embodiment of this application further provides a computer program product. The computer program product is configured to store a computer program. When the computer program is executed by a computer, the computer may implement the communication method for a dual connectivity system provided in the foregoing method embodiments.

An embodiment of this application further provides a chip. The chip is coupled to a memory, and the chip is configured to implement the communication method for a dual connectivity system provided in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method for a dual connectivity system, the method applied to a terminal device and comprising:
   receiving first information from a first network device, the first information indicating the terminal device to deactivate a secondary cell group (SCG) of the terminal device, wherein the first network device is a master node or a secondary node of the terminal device;
   receiving, from a second network device that is the master node or the secondary node, a trigger condition for relaxing the SCG RRM measurement, wherein the trigger condition comprises at least one of the following conditions: a signal quality change of a primary secondary cell (PSCell) in the SCG in a specified period is not greater than a first threshold, or signal quality of the PSCell in the specified period is greater than a second threshold; and
   after deactivating the SCG based on the first information and when the trigger condition is met, relaxing SCG radio resource management (RRM) measurement.

2. The method according to claim 1, wherein the SCG RRM measurement comprises a RRM measurement on the SCG, a RRM measurement on a frequency of a serving cell in the SCG or a frequency of a neighboring cell in the SCG, or a RRM measurement configured by the secondary node for the terminal device.

3. The method according to claim 1, the method further comprising:
   receiving second information from the first network device, the second information indicating to relax the RRM measurement on the SCG, the RRM measurement on the frequency of the serving cell in the SCG or the frequency of the neighboring cell in the SCG, or the RRM measurement configured by the secondary node for the terminal device.

4. The method according to claim 1, the method further comprising:
   obtaining a first measurement configuration that comprises: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary node for the terminal device.

5. The method according to claim 4, wherein the configuration information for relaxing the RRM measurement on the SCG comprises one or more of the following: an extended measurement periodicity, an extended measurement periodicity of a secondary cell (SCell) in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG.

6. The method according to claim 4, wherein the configuration information for relaxing the RRM measurement on the frequency of the serving cell in the SCG or the frequency of the neighboring cell in the SCG comprises one or more of the following: an extended measurement periodicity of the frequency of the serving cell in the SCG or the frequency of the neighboring cell in the SCG, indication information indicating to reduce a quantity of to-be-measured frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG.

7. The method according to claim 1, wherein the relaxing SCGRRM measurement comprises performing one or more of the following operations:
extending measurement periodicities of all or a part of frequencies of serving cells in the SCG, extending measurement periodicities of all or a part of frequencies of neighboring cells in the SCG, extending a measurement periodicity of the serving cell or the neighboring cell in the SCG, reducing the quantity of to-be-measured frequencies of serving cells in the SCG or frequencies of neighboring cells in the SCG, reducing the quantity of to-be-measured cells, measuring the SCG as the neighboring cells, skipping performing RRM measurement configured by the secondary node for the terminal device, skipping measuring the neighboring cell or the frequency of the neighboring cell in the SCG, or skipping reporting the measurement result of the neighboring cell or the frequency of the neighboring cell in the SCG.

8. The method according to claim 1, the method further comprising:
receiving third information from the second network device, the third information indicating to release the trigger condition for relaxing the SCGRRM measurement;
releasing the trigger condition for relaxing the SCGRRM measurement, and
stopping relaxing the SCG RRM measurement.

9. A communications apparatus, comprising:
at least one processor,
at least one memory in communication with the at least one processor and to configured to store program instructions that, when executed by the at least one processor, cause the communication apparatus to perform the following operations:
receiving, from a first network device to a terminal device, first information indicating the terminal device to deactivate a secondary cell group (SCG) of the terminal device, wherein the first network device is a master node or a secondary node of the terminal device;
receiving, from a second network device that is the master node or the secondary node, a trigger condition for relaxing the SCG RRM measurement, wherein the trigger condition comprises at least one of the following conditions: a signal quality change of a primary secondary cell (PSCell) in the SCG in a specified period is not greater than a first threshold, or signal quality of the PSCell in the specified period is greater than a second threshold; and
after deactivating the SCG based on the first information and when the trigger condition is met, relaxing SCG radio resource management (RRM) measurement.

10. The communication apparatus according to claim 9, wherein the SCG RRM measurement comprises a RRM measurement on the SCG, a RRM measurement on a frequency of a serving cell in the SCG or a frequency of a neighboring cell in the SCG, or a RRM measurement configured by the secondary node for the terminal device.

11. The communication apparatus according to claim 9, wherein the program instructions, when executed by the at least one processor, cause the communication apparatus to perform the following operation:
receiving second information from the first network device, wherein the second information indicates to relax the RRM measurement on the SCG, the RRM measurement on the frequency of the serving cell in the SCG or the frequency of the neighboring cell in the SCG, or the RRM measurement configured by the secondary node for the terminal device.

12. The communication apparatus according to claim 9, wherein the program instructions, when executed by the at least one processor, further cause the communication apparatus to perform the following operation:
obtaining a first measurement configuration, wherein the first measurement configuration comprises: configuration information for relaxing the RRM measurement on the SCG, configuration information for relaxing the RRM measurement on the frequency of the serving cell in the SCG or the frequency of the neighboring cell in the SCG, or configuration information for relaxing the RRM measurement configured by the secondary node for the terminal device.

13. The communication apparatus according to claim 12, wherein the configuration information for relaxing the RRM measurement on the SCG comprises one or more of the following: an extended measurement periodicity, an extended measurement periodicity of a secondary cell (SCell) in the SCG, indication information indicating to reduce a quantity of measurement frequencies or cells, indication information indicating to measure the SCG as neighboring cells, indication information indicating not to measure the neighboring cell or the frequency of the neighboring cell in the SCG, or indication information indicating not to report a measurement result of the neighboring cell or the frequency of the neighboring cell in the SCG.

14. The communication apparatus according to claim 12, wherein the configuration information for relaxing the RRM measurement on the frequency of the serving cell in the SCG or the frequency of the neighboring cell in the SCG comprises one or more of the following: an extended measurement periodicity of the frequency of the serving cell in the SCG or the frequency of the neighboring cell in the SCG, indication information indicating to reduce a quantity of to-be-measured frequencies of serving cells in the SCG or frequencies of neighboring cells in the SCG or cells, indication information indicating to measure the frequency of the serving cell in the SCG as a frequency of a neighboring cell, indication information indicating not to measure the frequency of the serving cell in the SCG or the frequency of the neighboring cell in the SCG, or indication information indicating not to report a measurement result of the frequency of the serving cell in the SCG or the frequency of the neighboring cell in the SCG.

15. The communication apparatus according to claim 9, wherein the relaxing SCG RRM measurement comprises performing one or more of the following operations:
extending measurement periodicities of all or a part of frequencies of serving cells in the SCG, extending measurement periodicities of all or a part of frequencies of neighboring cells in the SCG, extending a measurement periodicity of the serving cell or the neighboring cell in the SCG, reducing the quantity of to-be-measured frequencies of serving cells in the SCG or frequencies of neighboring cells in the SCG, reducing the quantity of to-be-measured cells, measuring the SCG as the neighboring cells, skipping performing RRM measurement configured by the secondary node for the terminal device, skipping measuring the neighboring cell or the frequency of the neighboring cell in the SCG, or skipping reporting the measurement result of the neighboring cell or the frequency of the neighboring cell in the SCG.

16. The communication apparatus according to claim 9, wherein the program instructions, when executed by the at least one processor, cause the communication apparatus to perform the follow operations:
   receiving, from the second network device, third information indicating to release the trigger condition for relaxing the SCG RRM measurement;
   releasing the trigger condition for relaxing the SCGRRM measurement; and
   stopping relaxing the SCG RRM measurement.

17. A dual connectivity system comprising a first network device and a second network device, wherein the first network device is configured to determine that a terminal device is to deactivate a secondary cell group (SCG) of the terminal device; and send first information to the terminal device, wherein the first information indicates the terminal device to deactivate the SCG, to enable the terminal device to relax SCG radio resource management (RRM) measurement after deactivating the SCG,
   wherein the first network device is a master node of the terminal device and the second network device is a secondary node of the terminal device; or the first network device is a secondary node of the terminal device and the second network device is a master node of the terminal device; and
   wherein the second network device is configured to receive a trigger condition for relaxing the SCGRRM measurement, and send a response message in response to the trigger condition for relaxing the SCG RRM measurement, wherein the response message is for acknowledging or modifying the trigger condition for relaxing the SCGRRM measurement.

* * * * *